United States Patent
Aoki et al.

(10) Patent No.: US 12,377,865 B2
(45) Date of Patent: Aug. 5, 2025

(54) CONTROL DEVICE FOR VEHICLE

(71) Applicant: TOYOTA JIDOSHA KABUSHIKI KAISHA, Toyota (JP)

(72) Inventors: Masakazu Aoki, Nagoya (JP); Yohsuke Hashimoto, Nagakute (JP); Satoshi Takamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 18/380,232

(22) Filed: Oct. 16, 2023

(65) Prior Publication Data

US 2024/0199037 A1 Jun. 20, 2024

(30) Foreign Application Priority Data

Dec. 14, 2022 (JP) ................. 2022-199588

(51) Int. Cl.
*B60W 50/00* (2006.01)
*B60W 30/16* (2020.01)
(Continued)

(52) U.S. Cl.
CPC ........ *B60W 50/0098* (2013.01); *B60W 30/16* (2013.01); *B60W 40/09* (2013.01);
(Continued)

(58) Field of Classification Search
CPC ....... B60W 2554/802; B60W 2556/10; B60W 40/09; B60W 2050/0005; B60W 2050/0075; B60W 2050/0083; B60W 2050/0088; B60W 2520/04; B60W 2554/402; B60W 2554/4026; B60W 2554/4041; B60W 2554/4042;
(Continued)

(56) References Cited

U.S. PATENT DOCUMENTS 8,355,851 B2 1/2013 Inoue et al.
8,370,040 B2 2/2013 Inoue et al.
(Continued)

FOREIGN PATENT DOCUMENTS

JP H07-108849 A 4/1995
WO WO-2018138767 A1 * 8/2018

*Primary Examiner* — Wade Miles
*Assistant Examiner* — Jerrod Irvin Davis
(74) *Attorney, Agent, or Firm* — Dinsmore & Shohl LLP (57) ABSTRACT

A control device for a vehicle controls a subject vehicle configured to switch between manual driving by a driver and automated driving. The control device includes a processor and a memory device. The processor is configured to execute learning control that learns vehicle-to-vehicle information being vehicle-to-vehicle time or vehicle-to-vehicle distance of the subject vehicle with respect to a preceding vehicle during traveling with the manual driving, and to reflect a learning result of the vehicle-to-vehicle information by the learning control in a control of the vehicle-to-vehicle information during the automated driving. The memory device is configured to store the vehicle-to-vehicle information as learning data during the manual driving. In the learning control, the processor determines, based on a type of the preceding vehicle, whether or not the vehicle-to-vehicle information for the preceding vehicle is caused to be stored in the memory device as the learning data.

6 Claims, 4 Drawing Sheets

(51) Int. Cl.
 *B60W 40/09* (2012.01)
 *B60W 40/105* (2012.01)
 *B60W 60/00* (2020.01)

(52) U.S. Cl.
 CPC ...... *B60W 40/105* (2013.01); *B60W 60/0051* (2020.02); *B60W 2050/0005* (2013.01); *B60W 2050/0083* (2013.01); *B60W 2554/4026* (2020.02); *B60W 2554/802* (2020.02)

(58) Field of Classification Search
 CPC .. B60W 2754/30; B60W 30/16; B60W 30/17; B60W 40/105; B60W 50/0098; B60W 60/001; B60W 60/005; B60W 60/0051
 See application file for complete search history.

(56) References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2017/0137033 A1* | 5/2017 | Habu ............... B60W 10/20 |
| 2019/0295419 A1 | 9/2019 | Tosa et al. |
| 2021/0291868 A1* | 9/2021 | Okuda ............. B60W 60/0015 |
| 2025/0042398 A1* | 2/2025 | Ozaki ................ G08G 1/16 |

\* cited by examiner

<Vehicle-to-Vehicle Information>

| Learning Conditions C | No. | Condition |
|---|---|---|
| Preconditions C0 | C0-1 | Height H of preceding vehicle < threshold value TH1 |
| | C0-2 | Preceding vehicle not two-wheeled motorcycle |
| | C0-3 | Road not congested |
| | C0-4 | Road surface and visibility good |
| | C0-5 | Not narrow street but public road |
| | C0-6 | Road gradient small |
| | C0-7 | Not merging point |
| First Conditions C1 During Follow-up Traveling | C1-1 | Designated time elapses since previous learning |
| | C1-2 | Vehicle speed changes by designated amount or more since previous learning |
| | C1-3 | Continuing to follow same preceding vehicle |
| Second Conditions C2 During Follow-up Traveling | C2-1 | Not extremely low speed or extremely high speed |
| | C2-2 | Relative speed (absolute value) to preceding vehicle small |
| | C2-3 | Vehicle speed V constant |
| | C2-4 | Steering angle (absolute value) small |
| | C2-5 | Blinker inactive |
| | C2-6 | Conditions C2-1 to C2-5 continuously satisfied |

CONTROL DEVICE FOR VEHICLE

CROSS-REFERENCES TO RELATED APPLICATION

The present disclosure claims priority under 35 U.S.C. § 119 to Japanese Patent Application No. 2022-199588, filed on Dec. 14, 2022, which is incorporated herein by reference in its entirety.

TECHNICAL FIELD

The present disclosure relates to a control device for a vehicle configured to switch between manual driving and automated driving.

BACKGROUND

JP H07-108849 A discloses an automated travel control device for a vehicle. The automated travel control device learns a driving method of a driver based on the situation around the subject vehicle and the travel state of the subject vehicle. According to the learning, the preference of each driver regarding the driving method of the vehicle is learned. Then, the automated travel control device controls the vehicle traveling based on a result of the learning.

SUMMARY

Regarding the learning of the preference of a driver for vehicle-to-vehicle information (vehicle-to-vehicle time or vehicle-to-vehicle distance) of the subject vehicle with respect to a preceding vehicle while the subject vehicle is traveling by manual driving, there are a timing suitable for the learning and a timing unsuitable for the learning while the vehicle is traveling. In this regard, according to the technique described in JP H07-108849 A, the timing of learning is not clearly specified. Therefore, depending on the timing of the learning, the preference of the driver may not be appropriately learned.

The present disclosure has been made in view of the problem described above, and an object thereof is to provide a control device for a vehicle that can learn the preference of a driver for vehicle-to-vehicle information of the subject vehicle with respect to a preceding vehicle at an appropriate timing during traveling of the subject vehicle by manual driving.

A control device for a vehicle according to the present disclosure is configured to control a subject vehicle configured to switch between manual driving by a driver and automated driving. The control device includes a processor and a memory device. The processor is configured to execute learning control that learns vehicle-to-vehicle information being vehicle-to-vehicle time or vehicle-to-vehicle distance of the subject vehicle with respect to a preceding vehicle during traveling with the manual driving, and to reflect a learning result of the vehicle-to-vehicle information by the learning control in a control of the vehicle-to-vehicle information during the automated driving. The memory device is configured to store the vehicle-to-vehicle information as learning data during the manual driving. In the learning control, the processor is configured to determine, based on a type of the preceding vehicle, whether or not the vehicle-to-vehicle information for the preceding vehicle is caused to be stored in the memory device as the learning data. In addition, machine learning may be used to acquire the learning result of the vehicle-to-vehicle information by the learning control.

According to the control device of the present disclosure, the driver's preference for the vehicle-to-vehicle information of the subject vehicle with respect to the preceding vehicle can be learned at an appropriate timing while the subject vehicle is traveling by the manual driving.

DETAILED DESCRIPTION

Embodiments of the present disclosure will be described with reference to the accompanying drawings.

1. Configuration of Vehicle

Figure 1:
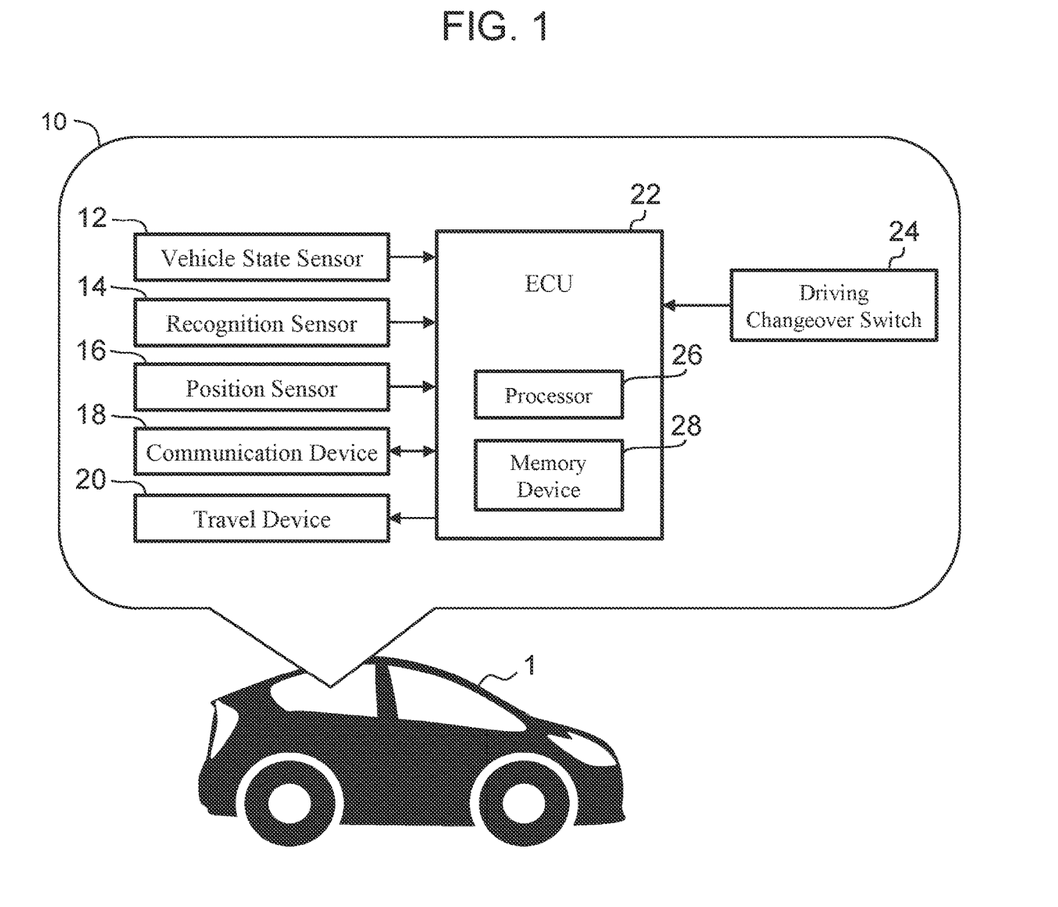
FIG. 1 is a diagram schematically illustrating an example of a configuration of a vehicle (subject vehicle) according to an embodiment.

FIG. 1 is a diagram schematically illustrating an example of a configuration of a vehicle 1 according to an embodiment. The vehicle 1 includes a vehicle control system 10. The vehicle control system 10 is mounted on the vehicle 1 and is configured to control traveling of the vehicle 1. The vehicle control system 10 includes a vehicle state sensor 12, a recognition sensor 14, a position sensor 16, a communication device 18, a travel device 20, an electronic control unit (ECU) 22, and a driving changeover switch 24.

The vehicle state sensor 12 detects a state of the vehicle 1. The vehicle state sensor 12 includes, for example, a vehicle speed sensor, an acceleration sensor, an accelerator pedal sensor, a brake pedal sensor, a steering angle sensor, and a blinker sensor. The blinker sensor detects an operating state of a blinker. The recognition sensor 14 recognizes (detects) a situation around the vehicle 1. The recognition sensor 14 includes, for example, a camera. The position sensor 16 detects a position and a direction of the vehicle 1. The position sensor 16 includes, for example, a global navigation satellite system (GNSS) receiver.

The communication device 18 communicates with the outside of the vehicle 1. The communication device 18 communicates with, for example, an external system and acquires various pieces of information. The information includes, for example, map information and traffic information. The map information includes road information, such as road gradient. The traffic information includes, for example, traffic jam information, information on a road surface state, and information on visibility, such as heavy rain or occurrence of fog. In addition, the communication device 18 may include, for example, a vehicle-to-vehicle communication device that enables communication between the vehicle 1 and surrounding vehicles (i.e., vehicle-to-vehicle communication (V2V)).

The travel device 20 is a device that operates the vehicle 1. For example, the travel device 20 includes a drive device, a brake device, and a steering device. The drive device includes, for example, at least one of an electric motor and an internal combustion engine for driving (accelerating) the vehicle 1. The brake device includes a brake actuator for braking (decelerating) the vehicle 1. The steering device includes, for example, a steering motor for steering the vehicle 1.

The ECU 22 is a computer configured to control the vehicle 1 and corresponds to an example of the "control device for a vehicle" according to the present disclosure. The ECU 22 includes a processor 26 and a memory device 28. The processor 26 executes various processes. The various processes include processes related to vehicle travel control described below. The memory device 28 stores various types of information necessary for processing by the processor 26. When the processor 26 executes computer programs, various processes by the ECU 22 are realized. The computer programs are stored in the memory device 28. Alternatively, the computer programs may be recorded on a computer-readable recording medium. In addition, the ECU 22 may be configured by combining a plurality of ECUs.

The vehicle control system 10 is configured to perform automated driving control for controlling "automated driving" of the vehicle 1. This automated driving control has a follow-up traveling function of causing the vehicle 1 to travel so as to follow the preceding vehicle while controlling vehicle-to-vehicle time T or vehicle-to-vehicle distance D of the vehicle (subject vehicle) 1 with respect to the preceding vehicle. More specifically, the automated driving referred to here corresponds to, for example, automated driving at level 3 or higher in the definition of the Society of Automotive Engineers (SAE) in the United States, but is not necessarily limited to the automated driving at level 3 or higher. That is, the automated driving control may be any control as long as it has the follow-up traveling function described above, and may be, for example, an adaptive cruise control (ACC). A known technique is applied to the automated driving control. Therefore, a detailed description of the automated driving control is omitted.

The driving changeover switch 24 is operated by the driver, and is used to switch the driving of the vehicle 1 between manual driving by the driver and the automated driving. That is, the vehicle 1 is configured to switch between the manual driving and the automated driving. The manual driving is performed by the driver's own intention to operate an accelerator pedal, a brake pedal, and a steering wheel of the vehicle 1.

2. Vehicle Travel Control

In the present embodiment, when the automated driving is selected by the driver who operates the driving changeover switch 24, the ECU 22 performs the automated driving control described above. On the other hand, when the manual driving is selected by the driver, the ECU 22 performs the following "vehicle-to-vehicle learning control".

2-1. Vehicle-to-Vehicle Learning Control During Follow-up Traveling

The vehicle-to-vehicle learning control (or simply learning control) according to the present embodiment learns "vehicle-to-vehicle distance information" of the subject vehicle 1 with respect to the preceding vehicle while the vehicle 1 is traveling by the manual driving. Learning results (for example, a learning value TL described below) of the vehicle-to-vehicle information by this learning control is reflected in the control of the vehicle-to-vehicle information during the automated driving.

Figure 2:
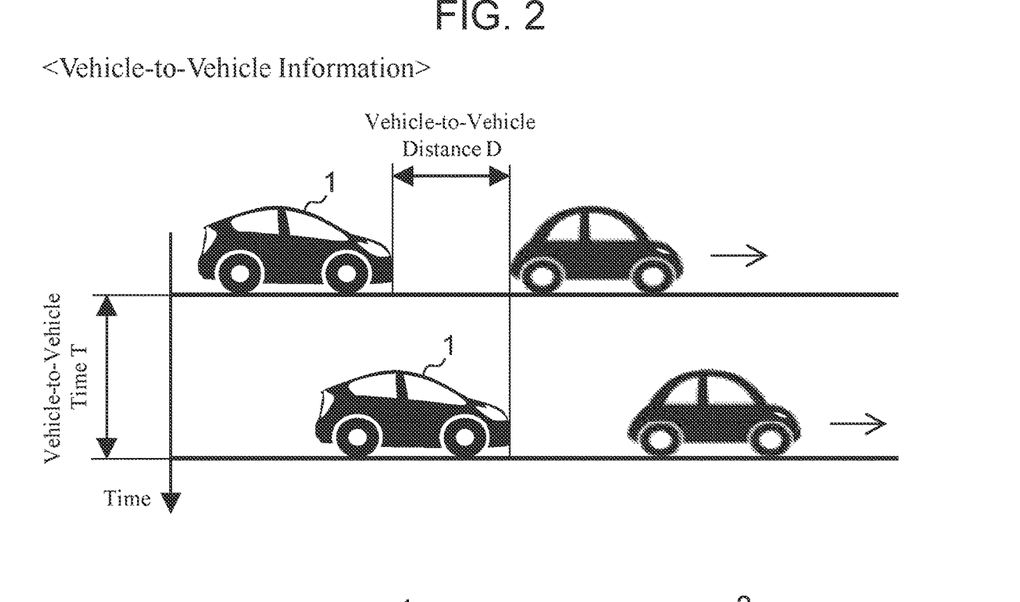
FIG. 2 is a diagram used to describe vehicle-to-vehicle information used in the embodiment.

FIG. 2 is a diagram used to describe the vehicle-to-vehicle information used in the embodiment. As shown in FIG. 2, the vehicle-to-vehicle information referred to here is the vehicle-to-vehicle time T or the vehicle-to-vehicle distance D of the subject vehicle 1 with respect to the preceding vehicle. The following description will be given by taking the vehicle-to-vehicle time T as an example, but the same applies to the vehicle-to-vehicle distance D. More specifically, the learning of the vehicle-to-vehicle time T is executed in association with the vehicle speed V of the subject vehicle 1 as will be described below in detail with reference to FIG. 5. This also applies to the example of the vehicle-to-vehicle distance D.

Learning conditions C are conditions for executing the learning by the learning control. In other words, the learning conditions C are conditions for storing the vehicle-to-vehicle time T which is learning data in the learning control. The learning conditions C are set as follows in order to accurately grasp the driver's preference regarding the vehicle-to-vehicle time T at the time of following the preceding vehicle. That is, whether or not the learning data (i.e., the vehicle-to-vehicle time T) is stored in the memory device 28 for a preceding vehicle is determined (changed) in accordance with the vehicle type of the preceding vehicle.

Specifically, the determination of the learning target according to the vehicle type of the preceding vehicle is executed based on, for example, the height H of the preceding vehicle. The vehicle-to-vehicle time T adjusted by the driver of the subject vehicle 1 during the manual driving is affected by the height H of the preceding vehicle. That is, when the height H is large, the front view of the driver of the subject vehicle 1 is likely to be obstructed. For example, traffic lights or signs ahead becomes difficult to see. Therefore, it is considered that, when following a preceding vehicle having a larger height H than that of the subject vehicle 1, the driver tends to secure a longer vehicle-to-vehicle time T as compared with when following a preceding vehicle having a height H equal to or less than that of the subject vehicle 1. As described above, the vehicle-to-vehicle time T adjusted by the driver during the manual driving may vary depending on the height H of the preceding vehicle.

Accordingly, in the learning control, when the height H of the preceding vehicle is less than a designated threshold value TH1, the ECU 22 stores the acquired vehicle-to-vehicle time T in the memory device 28 as the learning data, on the other hand, when the height H is equal to or greater than the threshold value TH1, the ECU 22 does not store the vehicle-to-vehicle time T in the memory device 28 as the learning data.

Figure 3A:
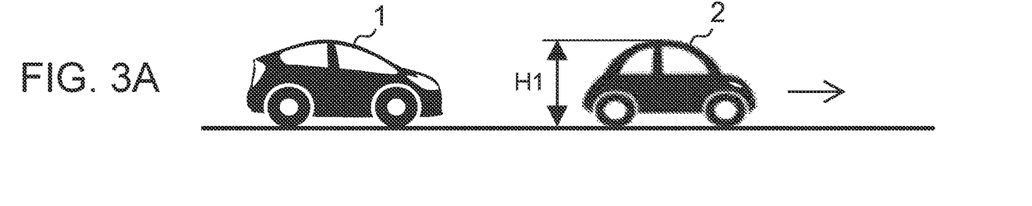
FIG. 3A is a diagram illustrating a specific example of the type of a preceding vehicle followed by the subject vehicle.
Figure 3B:
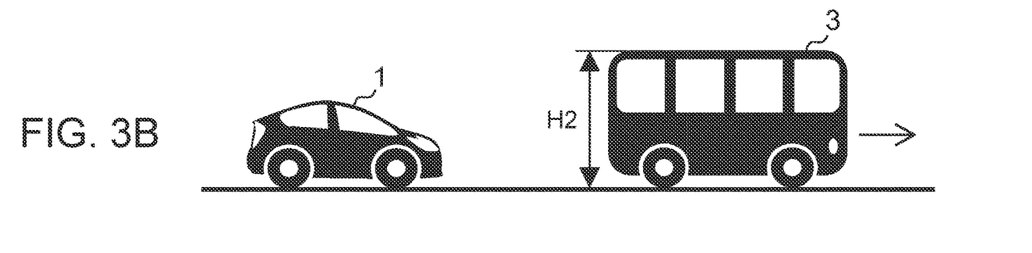
FIG. 3B is a diagram illustrating a specific example of the type of a preceding vehicle followed by the subject vehicle.
Figure 3C:
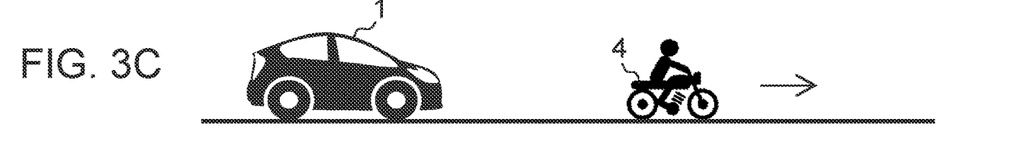
FIG. 3C is a diagram illustrating a specific example of the type of a preceding vehicle followed by the subject vehicle.

FIGS. 3A to 3C are diagrams illustrating specific examples of the vehicle type of the preceding vehicle followed by the subject vehicle 1. A preceding vehicle 2 in the example shown in FIG. 3A has a height H1 equivalent to that of the subject vehicle 1. On the other hand, a preceding vehicle 3 in the example shown in FIG. 3B has a height H2 greater than that of the subject vehicle 1.

Specifically, the preceding vehicle 2 is a car, and more specifically, for example, a four-wheeled car. The preceding vehicle 2 corresponds to, for example, a standard-sized car (a standard-sized passenger car, a compact passenger car, or a Japanese microcar) in the Japanese Road Traffic Law. In addition, the preceding vehicle 2 may be a private car or a commercial car. On the other hand, the preceding vehicle 3 is a larger vehicle (for example, a truck or a bus) than the preceding vehicle 2. More specifically, the preceding vehicle 3 corresponds to, for example, a semi-medium-sized vehicle, a medium-sized vehicle, or a large-sized vehicle in the Japanese Road Traffic Law.

The threshold value TH1 is determined in advance as a value that can distinguish the preceding vehicle 2 from the preceding vehicle 3. That is, the threshold value TH1 is located between the height H1 of the preceding vehicle 2 and the height H2 of the preceding vehicle 3. In other words, the threshold value TH1 corresponds to a value that can distinguish the standard-sized car from a vehicle having a height H greater than that of the standard-sized car.

In the example described with reference to the preceding vehicles 2 and 3, it is assumed that, like the preceding vehicle 2, the subject vehicle 1 is a standard-sized car. However, the type of the subject vehicle 1 is not necessarily limited to the standard-sized car. That is, the condition for excluding a preceding vehicle from the learning target in consideration of the vehicle type may be, for example, that the height H of the preceding vehicle is greater than the height of the subject vehicle 1 and the relative height ΔH of the preceding vehicle with respect to the subject vehicle 1 is equal to or greater than a designated threshold value.

A preceding vehicle 4 in the example shown in FIG. 3C is a two-wheeled motorcycle. When the subject vehicle 1 is a four-wheeled car and the preceding vehicle is a two-wheeled motorcycle, it is considered that the driver tends to have difficulty in grasping an appropriate vehicle-to-vehicle distance D due to reasons, such as the size and behavior of the preceding vehicle. Therefore, when following a two-wheeled motorcycle, it is considered that the driver tends to secure a long vehicle-to-vehicle time T or that the vehicle-to-vehicle time T tends to become unstable, as compared with when following a four-wheeled car, such as a standard-sized car. Therefore, the condition for excluding a preceding vehicle from the learning target in consideration of the vehicle type includes that the preceding vehicle is a two-wheeled motorcycle. That is, when the preceding vehicle is a two-wheeled motorcycle, the ECU 22 does not store the vehicle-to-vehicle time T in the memory device 28 as the learning data.

Moreover, if the learning control is continuously performed for the same preceding vehicle under the same environment while the subject vehicle 1 is traveling, the vehicle-to-vehicle time T may be continuously acquired in a biased manner for some reason. As a result, there is a possibility that the biased vehicle-to-vehicle time T is erroneously recognized as the driver's preference and learned. The "same environment" referred to here corresponds to, for example, when the subject vehicle 1 travels on the same road at the same vehicle speed V.

In order to avoid the biased learning described above, in the learning control, the ECU 22 stops the learning control until a designated time TH2 elapses after the vehicle-to-vehicle time T for calculating the learning value TL of the vehicle-to-vehicle time T is stored in the memory device 28 as the learning data. That is, storage of the learning data subsequent to this vehicle-to-vehicle time T is prohibited.

Furthermore, in order to avoid the biased learning described above, in the learning control, the ECU 22 stops the learning control until the vehicle speed V of the subject vehicle 1 changes by a designated amount TH3 or more after the vehicle-to-vehicle time T for calculating the learning value TL is stored in the memory device 28 as the learning data. That is, storage of the learning data subsequent to the vehicle-to-vehicle time T is prohibited. In other words, for example, after the vehicle speed V changes by the designated amount TH3 or more due to the fact that the subject vehicle 1 moves from an expressway to a general road while keeping following the same preceding vehicle after the previous learning, a newly acquired vehicle-to-vehicle time T is permitted to be stored in the memory device 28 as the learning date even for the same preceding vehicle as the previous learning. In addition, in an example in which the learning data is stored for each vehicle speed range, the designated amount TH3 of the vehicle speed V is, for example, a value determined in advance as a value for determining whether or not the vehicle speed range has shifted to another vehicle speed range.

Figure 4:
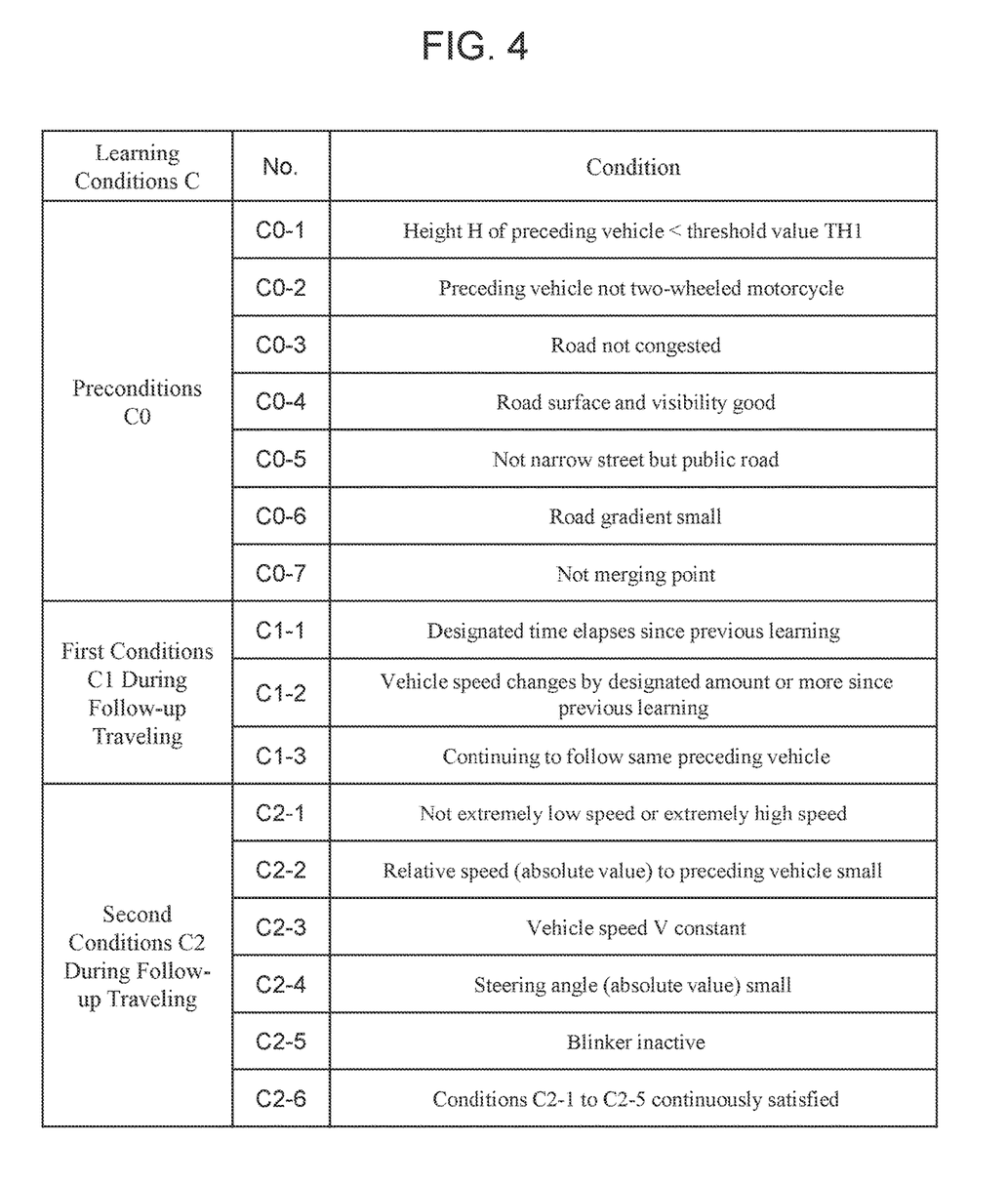
FIG. 4 is a table showing an example of a list of learning conditions C according to the embodiment.

FIG. 4 is a table showing an example of a list of the learning conditions C according to the embodiment. The learning conditions C in the example illustrated in FIG. 4 include the above-described learning conditions based on the viewpoint of the vehicle type and the viewpoint of the discontinuity of the travel situation. To be specific, in this table, the learning conditions C are divided into preconditions C0, first conditions C1 for the follow-up traveling, and second conditions C2 for the follow-up traveling. The first conditions C1 are learning conditions for a period of time from when the subject vehicle 1 starts following a preceding vehicle to when the subject vehicle 1 enters a steady follow-up travel state. The second conditions C2 are learning conditions in a steady (in other words, stable) follow-up travel state. The learning conditions C are satisfied when all of these conditions C0, C1, and C2 are satisfied.

The preconditions C0 include a condition C0-1 and a condition C0-2, which are conditions based on the viewpoint of the vehicle type of the preceding vehicle. In other words, the condition C0-1 is that the height H of the preceding vehicle is less than the threshold value TH1. Thus, by limiting the learning target to the vehicle type in which the driver of the subject vehicle 1 can easily secure the field of view, it is possible to avoid the variation of the learning data of the vehicle-to-vehicle time T caused by the difference of the vehicle type. The condition C0-2 is that the preceding vehicle is not a two-wheeled motorcycle. Thus, it is possible to prevent the learning data of the vehicle-to-vehicle time T from varying due to the difference in the sense of approach to the preceding vehicle caused by the difference in the vehicle type. In addition, instead of the conditions C0-1 and C0-2, for example, a condition that the vehicle type of the subject vehicle 1 is the same as that of the preceding vehicle may be included as one of the preconditions C0.

Moreover, the preconditions C0 include, for example, a condition C0-3, a condition C0-4, and a condition C0-5. The condition C0-3 is that the road on which the subject vehicle 1 travels is not congested. The condition C0-4 is that the road surface and the visibility are good. The condition C0-5 is that the road is not a narrow street but a public road. The reason these are included is that, in situations, such as when the road is congested, when the road surface or the visibility is not good, or when the subject vehicle 1 is traveling on a narrow street, the adjustment of the vehicle-to-vehicle time T by the driver is likely to be in accordance with the state of the surroundings and that, as a result, the preference of the driver is difficult to be accurately grasped.

Further, the preconditions C0 include, for example, that the absolute value of the road gradient is small (condition C0-6). This is because when the absolute value of the road gradient is large, such as a steep downhill, the vehicle-tovehicle time T tends to be increased due to, for example, the reason that the braking distance is likely to be extended, and thus the preference of the driver is difficult to be accurately grasped. Furthermore, the preconditions C0 include, for example, that the traveling point of the subject vehicle 1 is not a merging point of a plurality of roads (condition C0-7). This is because the vehicle-to-vehicle time T with the preceding vehicle may be increased for merging of another vehicle, and thus the preference of the driver is difficult to be accurately grasped.

Next, the first conditions C1 at the time of the follow-up traveling include a condition C1-1 and a condition C1-2 based on the viewpoint of the discontinuity of the travel situation described above. The condition C1-1 is that a designated time TH2 has elapsed since the acquisition of the learning data of the vehicle-to-vehicle time T (that is, since the previous learning). The condition C1-2 is that the vehicle speed V has changed by the designated amount TH3 or more since the acquisition of the learning of the vehicle-to-vehicle time T (i.e., since the previous learning). Each of them can prevent continuous learning from being performed when the subject vehicle 1 is continuously following the same preceding vehicle under the same environment, thereby preventing biased learning.

Moreover, the conditions C1 include a condition (C1-3) in which the subject vehicle 1 continues to follow the same preceding vehicle immediately before reaching the steady follow-up travel state. This is because, for example, when another preceding vehicle interrupts between the preceding vehicle intended by the driver and the subject vehicle 1 immediately before reaching the steady follow-up travel state, the vehicle-to-vehicle time T immediately after capturing the another preceding vehicle may be different from the preference of the driver.

Next, the second conditions C2 at the time of the follow-up traveling include, for example, that the vehicle speed V is not an extremely low speed or an extremely high speed (condition C2-1). This is because the vehicle-to-vehicle time T is likely to be adjusted in accordance with the state of the surroundings at an extremely low speed or an extremely high speed, and thus the preference of the driver is difficult to be accurately grasped. Moreover, for example, the second conditions C2 include: that the absolute value of relative speed to the preceding vehicle is less than a threshold value (condition C2-2); that the vehicle speed V is constant (condition C2-3); that the absolute value of the steering angle of the subject vehicle 1 is less than a threshold value (condition C2-4); that the blinker of the subject vehicle 1 is inactive (condition C2-5); and that the conditions C2-1 to C2-5 are continuously satisfied (condition C2-6). The reason these are included is to capture a stable follow-up state.

2-2. Processing Flow

Figure 5:
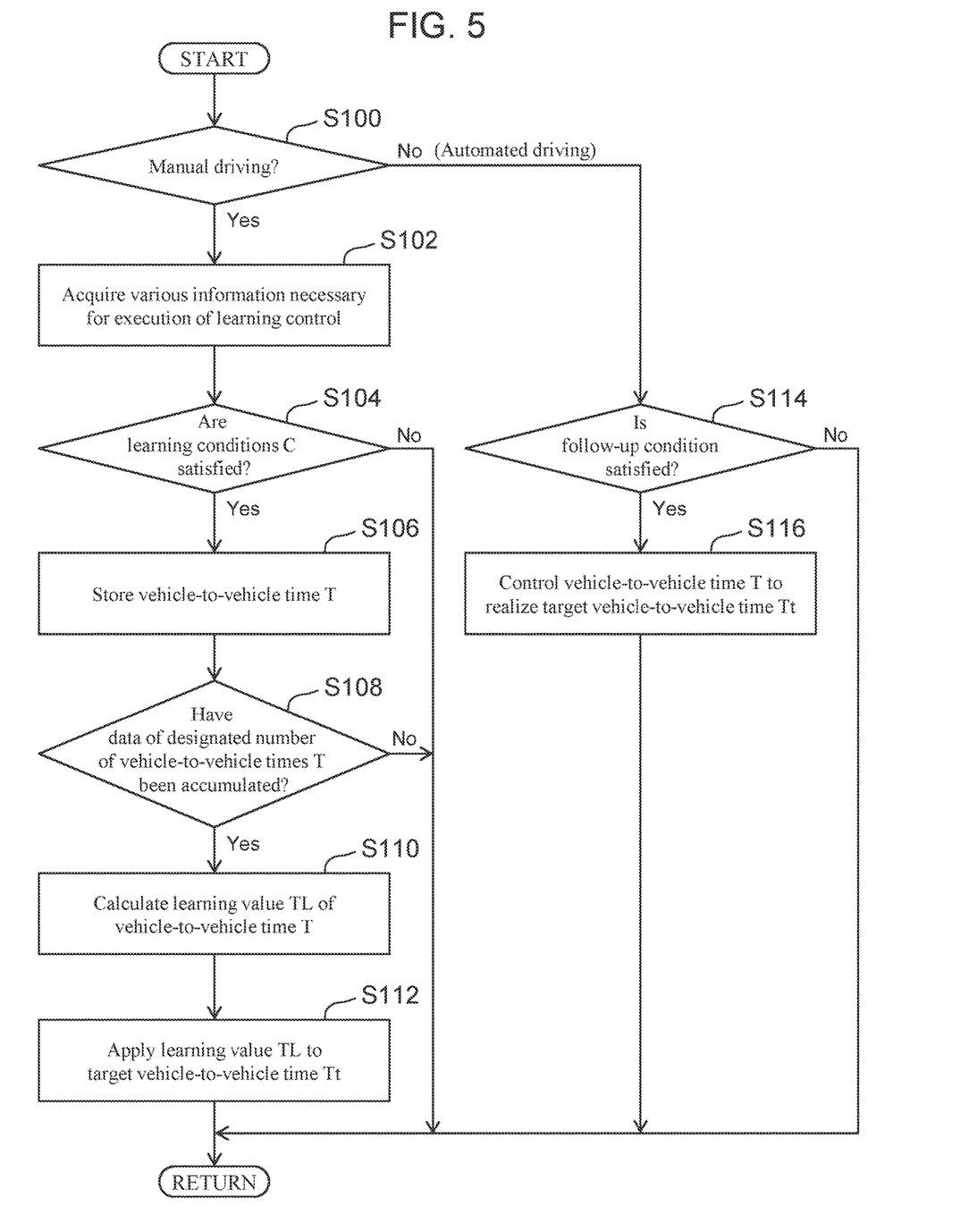
FIG. 5 is a flowchart illustrating an example of processing related to vehicle travel control according to the embodiment.

FIG. 5 is a flowchart illustrating an example of processing related to the vehicle travel control according to the embodiment. The processing of this flowchart is repeatedly executed during activation of the vehicle control system 10.

In step S100, the ECU 22 (processor 26) determines whether the vehicle 1 is in the manual driving or in the automated driving. This determination can be made based on, for example, the operating state of the driving change-over switch 24.

When the vehicle 1 is in the manual driving (Step S100; Yes), the processing proceeds to step S102. In step S102, the ECU 22 acquires various kinds of information necessary for execution of the learning control. The various kinds of information include the current vehicle-to-vehicle time T. The current vehicle-to-vehicle time T is calculated based on, for example, the vehicle-to-vehicle distance D acquired using the recognition sensor 14 and the vehicle speed V detected using the vehicle state sensor 12. Also, the various kinds of information described above include information necessary for determining whether or not the learning conditions C (for example, see FIG. 4) are satisfied. The information includes the height H of the preceding vehicle. The height H is acquired using, for example, the recognition sensor 14 or the vehicle-to-vehicle communication. In addition, the other information for determining the learning conditions C is acquired using, for example, information from the vehicle state sensor 12 and the recognition sensor 14, the road information (map information), and the traffic information.

In step S104 subsequent to step S102, the ECU 22 determines whether or not the learning conditions C are satisfied. More specifically, it is determined whether all of the conditions C0 to C2 described above are satisfied. As a result, when the learning conditions C are satisfied, that is, when it is determined that the follow-up traveling is being performed in a scene in which the preference of the driver appears in the vehicle-to-vehicle time T, the processing proceeds to step S106.

On the other hand, when at least one of the conditions C0 to C2 is not satisfied in the course of the subject vehicle 1 reaching the steady follow-up travel state after the start of the follow-up, the learning conditions C are not satisfied. When the learning conditions C are not satisfied, the processing proceeds to RETURN.

In step S106, the ECU 22 stores the vehicle-to-vehicle time T acquired in step S102. That is, when the learning conditions C are satisfied, the vehicle-to-vehicle time T is stored in the memory device 28 as the learning data. More specifically, the vehicle-to-vehicle time T is learned in association with the vehicle speed V. For example, the vehicle-to-vehicle time T is learned (stored) separately for each designated vehicle speed range. In addition, the learning conditions C include the second conditions C2, that is, conditions regarding the steady follow-up travel state. Therefore, the vehicle-to-vehicle time T is stored in the steady follow-up travel state performed while all of the above-described conditions C0, C1, and C2 are satisfied as the learning conditions C.

In step S108 subsequent to step S106, the ECU 22 determines whether data of a designated number of vehicle-to-vehicle times T have been accumulated. More specifically, it is determined whether or not the number of data of the vehicle-to-vehicle time T for the same vehicle speed range has reached a designated number. The designated number is, for example, 30. When the data of the designated number of vehicle-to-vehicle times T has not yet been accumulated (step S108; No), the processing proceeds to RETURN. On the other hand, when the data of the designated number is accumulated (step S108; Yes), the processing proceeds to step S110.

In step S110, the ECU 22 calculates a learning value TL of the vehicle-to-vehicle time T. For example, an average value of the accumulated data of the vehicle-to-vehicle times T is calculated as the learning value TL. Thereafter, the processing proceeds to step S112.

In step S112, the ECU 22 applies the learning value TL calculated in step S110 to a target vehicle-to-vehicle time Tt. The target vehicle-to-vehicle time Tt is used during the follow-up traveling with the automated driving. More specifically, the target vehicle-to-vehicle time Tt corresponding to the vehicle speed range associated with the learning value TL calculated in step S110 is updated by the learning value TL calculated this time.

On the other hand, when the vehicle 1 is in the automated driving (step S100; No), the processing proceeds to step S114. In step S114, the ECU 22 determines whether or not a designated follow-up condition for the preceding vehicle is satisfied by using, for example, information obtained from the recognition sensor 14. As a result, when this follow-up condition is satisfied, the processing proceeds to step S116. On the other hand, when the follow-up condition is not satisfied, the processing proceeds to RETURN.

In step S116, the ECU 22 controls the travel device 20 to control the (actual) vehicle-to-vehicle time T so as to realize the target vehicle-to-vehicle time Tt. More specifically, the (actual) vehicle-to-vehicle time T is controlled so as to approach the target vehicle-to-vehicle time Tt corresponding to the current vehicle speed range. As described above, by the processing from step S112 to step S116, the learning result (i.e., the learning value TL) of the vehicle-to-vehicle time T by the learning control is reflected in the control of the vehicle-to-vehicle time T during the automated driving.

In addition, the learning value TL may be acquired by using, for example, a machine learning model instead of the processing illustrated in FIG. 5. That is, the machine learning model is constructed by using various designated parameters including the vehicle speed V as inputs and using the learning value TL as an output. The various parameters are a plurality of parameters related to the learning conditions C described above. Learning of the machine learning model is performed using, for example, learning data acquired during the traveling of the vehicle 1 (that is, the various parameters described above which are explanatory variables (inputs) and the vehicle-to-vehicle time T which is an object variable).

3. Effect

When the vehicle-to-vehicle information (i.e., the vehicle-to-vehicle time T or the vehicle-to-vehicle distance D) is learned during the manual driving, if the vehicle type of the preceding vehicle is different, the preference of the driver with respect to the vehicle-to-vehicle information may be changed. As a result, a variation may occur in the learning result of the vehicle-to-vehicle information. According to the present embodiment described above, whether or not to store the vehicle-to-vehicle time T for the preceding vehicle as the learning data in the memory device 28 is determined in accordance with the vehicle type of the preceding vehicle. That is, the learning control is executed while limiting the vehicle type to be learned (in other words, limiting the learning scene). As a result, it is possible to reduce the variation in the learning results due to the change in the preference caused by the difference in the vehicle type. Therefore, the driver's preference for the vehicle-to-vehicle information can be learned at an appropriate timing. Further, during the automated driving, the target vehicle-to-vehicle time Tt (or a target vehicle-to-vehicle distance Dt) appropriately learned based on the preference of the driver can be used. Therefore, it is possible to realize the automated driving in which the stress of the driver is reduced.

4. Other Examples of Executing Learning Control

Each of the preconditions C0-3, C0-4, C0-5, and C0-6 described above may be used as follows, instead of limiting the traveling scene to be learned as in the processing of step S104. That is, for example, regarding the precondition C0-3, the learning control according to the present embodiment may be executed separately for the time when the road on which the subject vehicle 1 travels is not congested and the time when the road is congested. The same applies to the other preconditions C0-4, C0-5, and C0-6.

The invention claimed is:

1. A control device for controlling a subject vehicle configured to switch between manual driving by a driver and automated driving, the control device comprising:
  a processor configured to execute learning control that learns vehicle-to-vehicle information being vehicle-to-vehicle time or vehicle-to-vehicle distance of the subject vehicle with respect to a preceding vehicle during traveling with the manual driving, and to reflect a learning result of the vehicle-to-vehicle information by the learning control in a control of the vehicle-to-vehicle information during the automated driving; and
  a memory device configured to store the vehicle-to-vehicle information as learning data during the manual driving,
  wherein in the learning control, the processor is configured to:
    determine, based on a type of the preceding vehicle, whether or not the vehicle-to-vehicle information for the preceding vehicle is caused to be stored in the memory device as the learning data;
    when a height of the preceding vehicle is less than a threshold value, store the vehicle-to-vehicle information in the memory device as the learning data; and
    when the height is equal to or greater than the threshold value, not to store the vehicle-to-vehicle information in the memory device as the learning data.

2. The control device according to claim 1, wherein
  the subject vehicle is a four-wheeled car, and
  in the learning control, when the preceding vehicle is a two-wheeled motorcycle, the processor is configured not to store the vehicle-to-vehicle information in the memory device as the learning data.

3. The control device according to claim 1, wherein
  in the learning control, the processor is configured not to store a subsequent learning data in the memory device until a designated time elapses after the vehicle-to-vehicle information is caused to be stored in the memory device as the learning data.

4. The control device according to claim 1, wherein
  in the learning control, the processor is configured not to store a subsequent learning data in the memory device until a vehicle speed of the subject vehicle changes by a designated amount or more after the vehicle-to-vehicle information is caused to be stored in the memory device as the learning data.

5. A control device for controlling a subject vehicle configured to switch between manual driving by a driver and automated driving, the control device comprising:
  a processor configured to execute learning control that learns vehicle-to-vehicle information being vehicle-to-vehicle time or vehicle-to-vehicle distance of the subject vehicle with respect to a preceding vehicle during traveling with the manual driving, and to reflect a learning result of the vehicle-to-vehicle information by the learning control in a control of the vehicle-to-vehicle information during the automated driving; and
  a memory device configured to store the vehicle-to-vehicle information as learning data during the manual driving, wherein:

in the learning control, the processor is configured to determine, based on a type of the preceding vehicle, whether or not the vehicle-to-vehicle information for the preceding vehicle is caused to be stored in the memory device as the learning data, the subject vehicle is a four-wheeled car, and in the learning control, when the preceding vehicle is a two-wheeled motorcycle, the processor is configured not to store the vehicle-to-vehicle information in the memory device as the learning data.

6. A control device for controlling a subject vehicle configured to switch between manual driving by a driver and automated driving, the control device comprising:

a processor configured to execute learning control that learns vehicle-to-vehicle information being vehicle-to-vehicle time or vehicle-to-vehicle distance of the subject vehicle with respect to a preceding vehicle during traveling with the manual driving, and to reflect a learning result of the vehicle-to-vehicle information by the learning control in a control of the vehicle-to-vehicle information during the automated driving; and a memory device configured to store the vehicle-to-vehicle information as learning data during the manual driving, wherein:

in the learning control, the processor is configured to determine, based on a type of the preceding vehicle, whether or not the vehicle-to-vehicle information for the preceding vehicle is caused to be stored in the memory device as the learning data; and in the learning control, the processor is configured not to store a subsequent learning data in the memory device until a designated time elapses after the vehicle-to-vehicle information is caused to be stored in the memory device as the learning data.

* * * * *